(12) United States Patent  (10) Patent No.: US 9,767,589 B1
Siegel  (45) Date of Patent: *Sep. 19, 2017

(54) SYSTEM AND METHOD FOR DISPLAYING GEOGRAPHIC IMAGERY

(71) Applicant: Google Inc., Mountain View, CA (US)

(72) Inventor: Jonathan Siegel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/852,902

(22) Filed: Sep. 14, 2015

Related U.S. Application Data

(63) Continuation of application No. 13/682,414, filed on Nov. 20, 2012, now Pat. No. 9,171,527.

(51) Int. Cl.
*G09G 5/36* (2006.01)
*G06T 11/60* (2006.01)
*G09G 5/14* (2006.01)

(52) U.S. Cl.
CPC ............... *G06T 11/60* (2013.01); *G09G 5/14* (2013.01); *G09G 5/36* (2013.01)

(58) Field of Classification Search
CPC ............. G06T 11/60; G09G 5/14; G09G 5/36
USPC .......................................................... 345/629
See application file for complete search history.

(56) References Cited

U.S. PATENT DOCUMENTS

| | | | |
|---|---|---|---|
| 2005/0052413 A1* | 3/2005 | Ueno | G09G 5/42 345/158 |
| 2006/0004512 A1 | 1/2006 | Herbst et al. | |
| 2006/0133692 A1 | 6/2006 | Shih et al. | |
| 2006/0227349 A1* | 10/2006 | Yamaguchi | G06F 17/214 358/1.11 |
| 2008/0291201 A1 | 11/2008 | Lafon | |
| 2009/0024319 A1* | 1/2009 | Tsuji | G01C 21/3673 701/533 |
| 2009/0240431 A1 | 9/2009 | Chau et al. | |
| 2010/0023878 A1* | 1/2010 | Douris | H04L 12/6418 715/757 |
| 2010/0123737 A1 | 5/2010 | Williamson et al. | |
| 2010/0215250 A1 | 8/2010 | Zhu | |
| 2011/0298928 A1 | 12/2011 | Chen et al. | |

* cited by examiner

*Primary Examiner* — Barry Drennan
*Assistant Examiner* — Terrell Robinson
(74) *Attorney, Agent, or Firm* — Dority & Manning, PA

(57) ABSTRACT

In one aspect, a computer-implemented method is disclosed for providing geographic imagery. The method may include receiving, at a computing device, a request for a geographic image, wherein the geographic image depicts at least a portion of a selected location within a geographic area. In addition, the method may include presenting, with the computing device, the geographic image and superimposing a map including normalized travel way data associated with the geographic area over at least a portion of the geographic image.

20 Claims, 9 Drawing Sheets

SYSTEM AND METHOD FOR DISPLAYING GEOGRAPHIC IMAGERY

CROSS-REFERENCE TO RELATED APPLICATIONS

This application is a continuation of U.S. patent application Ser. No. 13/682,414, filed on Nov. 20, 2012, the disclosure of which is hereby incorporated by reference herein in its entirety for all purposes.

FIELD

The present subject matter relates generally to systems and methods for displaying geographic imagery, and more particularly to systems and methods for displaying panoramic imagery, such as interactive immersive panoramic imagery.

BACKGROUND

Computerized systems and methods for providing and/or displaying imagery, in particular panoramic imagery, are known. In the context of geographic information systems and digital mapping systems, services such as Google Maps are capable of providing street level images of geographical locations. The images, known on Google Maps as "Street View," typically provide immersive 360° panoramic views centered around a geographic area of interest, with the panoramic views being interconnected within a three-dimensional space. The panoramic views allow a user to view a geographic location from a person's perspective, as if the user was located on the street level or ground level associated with the geographic location.

User interfaces for navigating imagery typically allow a user to navigate between interconnected panoramic images by selecting a navigation button (e.g., an arrow) that moves the current street-level view to the adjacent panoramic image. However, such navigation of interconnected panoramic images can be rather cumbersome since the user is not able to quickly move between non-adjacent panoramic images and is often unable to view points-of-interest located within the surrounding geographic area.

SUMMARY

Aspects and advantages of the invention will be set forth in part in the following description, or may be obvious from the description, or may be learned through practice of the invention.

In one aspect, the present subject matter is directed to a computer-implemented method for providing geographic imagery. In one embodiment, the method may include receiving, at a computing device, a request for a geographic image, wherein the geographic image depicts at least a portion of a selected location within a geographic area. In addition, the method may include presenting, with the computing device, the geographic image and superimposing a map including normalized travel way data associated with the geographic area over at least a portion of the geographic image.

In another aspect, the present subject matter is directed to a computer-implemented method for providing geographic imagery. In one embodiment, the method may include receiving, at a computing device, a request for a geographic image, wherein the geographic image depicts a first portion of a panoramic image of a selected location within a geographic area. A first viewing angle being associated with the first portion of the panoramic image. In addition, the method may include presenting, with the computing device, the geographic image, superimposing a map including travel way data associated with the geographic area over at least a portion of the geographic image and orienting the travel way data on the map based on the first viewing angle.

In a further aspect, the present subject matter is directed to a computer-implemented method for providing geographic imagery. In one embodiment, the method may include receiving, at a computing device, a request for a geographic image, wherein the geographic image depicts a selected location within a geographic area including at least one entity. In addition, the method may include presenting, with the computing device, the geographic image, superimposing a map including indicia associated with the at least one entity over at least a portion of the geographic image, receiving data indicative of a user interaction with the indicia and in response to the user interaction, presenting, with the computing device, a second geographic image depicting at least a portion of the at least one entity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
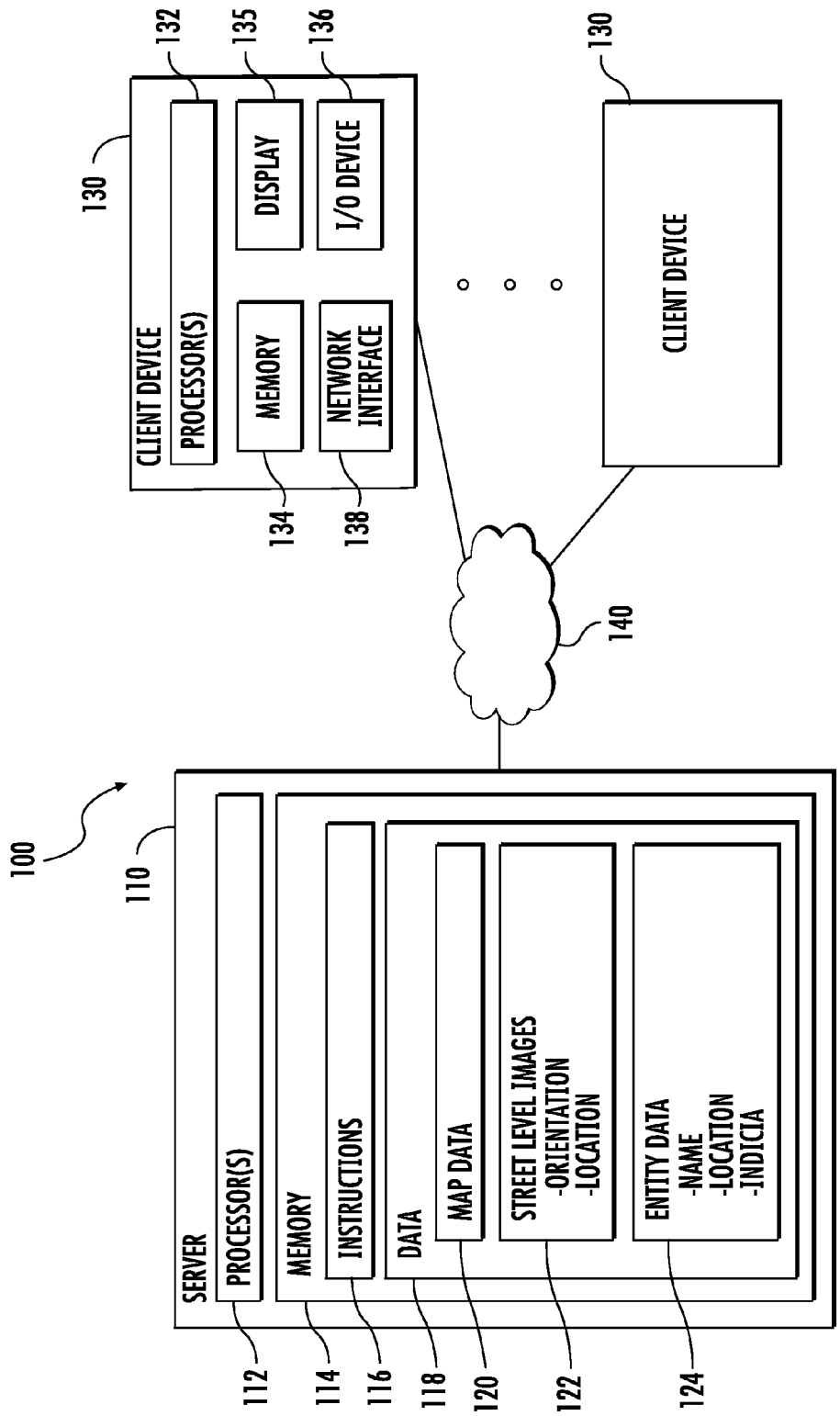
FIG. 1 illustrates a schematic diagram of one embodiment of a system for providing and displaying panoramic imagery in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for displaying geographic imagery, such as immersive panoramic imagery. Specifically, in several embodiments, a street level image forming part of a panoramic image may be presented on a user interface with a map superimposed over a portion of the street level image. The map may generally include data associated with the streets and/or entities located within the area surrounding the geographic location of the panoramic image such that a simplified and normalized street/entity network may be presented to a user. For example, each street within the local vicinity of the geographic location of the panoramic image may be displayed on the map as a straight line segment.

Additionally, in several embodiments, the data displayed on the map may be angled or skewed to match the orientation of the current view of the street level image presented to the user. For example, the street on which the panoramic image is located (i.e., the "active street") may be oriented horizontally on the map when the current view of the street level image is directed perpendicular to the active street. However, as the current view is rotated clockwise or counterclockwise from perpendicular, the orientation of the active street may be skewed in the opposite direction.

Moreover, the map may also be used as a means for navigating between the plurality of interconnected panoramic images spaced apart around the geographic area. For example, in one embodiment, a user may be able to navigate between panoramic images by simply clicking or touching the map at the location at which a panoramic image is desired to be viewed. In another embodiment, a user may navigate between panoramic images by performing a click and drag operation along a portion of the map.

Referring now to the drawings, FIG. 1 illustrates one embodiment of an exemplary system 100 for displaying geographic imagery in accordance with aspects of the present subject matter. As will be described below, the system 100 may provide for the display of interactive panoramic imagery, such as street level imagery, of a geographic area to users. The system 100 may include a client-server architecture where a server 110 communicates with one or more clients 130 over a network 140. Although only two clients 130 are shown in FIG. 1, it should be appreciated that any number of clients 130 may be connected to the server 110 over the network 140.

The server 110 may host a geographic information system, such as a mapping application (e.g. the Google Maps™ mapping services provided by Google Inc.), a virtual globe application (e.g. the Google Earth™ virtual globe application provided by Google Inc.), or any other suitable geographic information system. On the client-side, each client 130 can present a user interface, such as a browser, that allows a user to interact with the geographic information system. The server 110 transmits data, such as panoramic images and other data, over the network 140 to the client 130. Upon receipt of this data, the client 130 can present panoramic imagery and other associated data, via the user interface, in a display device associated with the client 130. A user can then interact with the panoramic imagery/data presented in the user interface to navigate the panoramic imagery as will be discussed in greater detail below.

The server 110 can be any computing device, such as a web server, and can include a processor 112 and a memory 114. The memory 114 can store instructions 116 which cause the processor to perform operations. For instance, the memory 114 can store instructions 116 to implement one or more modules for providing panoramic imagery to client devices 130 over the network 140.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

Memory 114 can also include data 118 used to implement a geographic information system. For instance, memory 114 can include or be coupled to a map database 120, a street level image database 122, and an entity database 124. The databases can be connected to the server 110 by a high bandwidth LAN or WAN, or could also be connected to server 110 through network 140. The databases, including map database 120, the street level image database 122 and the entity database 124 can be split up so that they are located in multiple locales.

Map database 120 of server 110 stores map-related information, at least a portion of which can be transmitted to a client device 130 over network 140. For example, map database 120 can store map tiles, where each tile is a map image of a particular geographic area. Depending on the resolution (e.g., whether the map is zoomed in or out), one tile can cover a large region (e.g. a State) in relatively little detail. Another tile can cover a much smaller region (e.g. a neighborhood) in relatively high detail. The map information is not limited to any particular format. For example, the images can include street maps, satellite images, aerial images, other suitable images, or a combination of these. The images can be stored as vectors (e.g. in the case of street maps) or bitmaps (e.g. in the case of satellite images and/or aerial images). The various map tiles can be associated with geographic locations such that the server 110 is capable of selecting, retrieving and transmitting one or more tiles in response to a request receiving by a client 130 specifying a selected geographic location.

Figure 3:
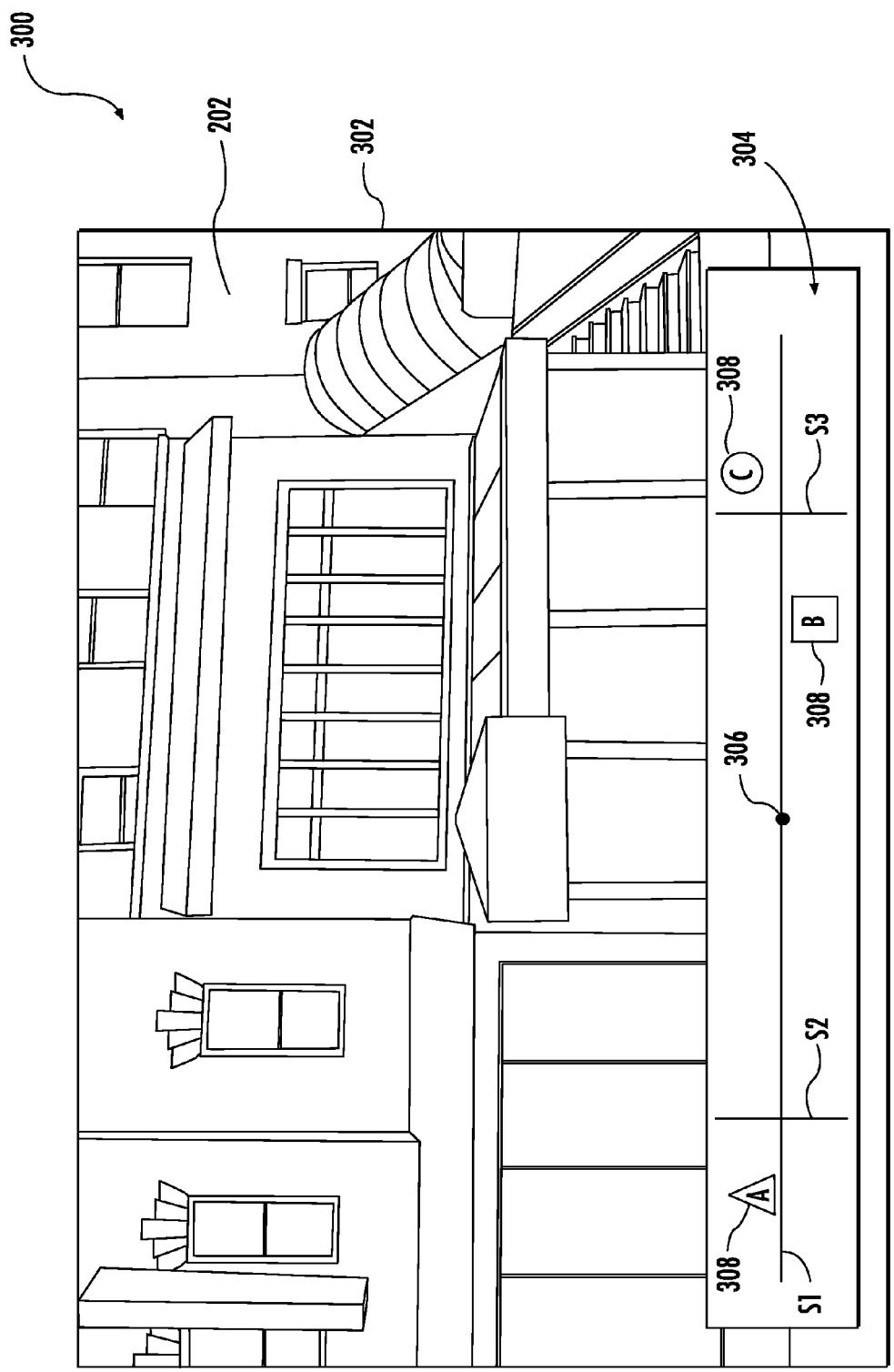
FIG. 3 illustrates one embodiment of a user interface for displaying panoramic imagery in accordance with aspects of the present subject matter, particularly illustrating the user interface with a map superimposed over a portion of the panoramic image.

The street level image database 122 stores street level images associated with the geographic locations. Street level images comprise images of objects at geographic locations captured by cameras positioned at the geographic location from a perspective at or near the ground level or street level. For example, street level images often comprise images of objects taken from a perspective of a person standing in the street passing through the geographic location. An exemplary street level image 202 is shown in FIG. 3. However, although the term "street level" images is used, the images can depict non-street areas, including, but not limited to, exterior non-street areas, such as trails and walkways, and interior non-street areas, such as building interiors. For example, a street level image of the interior of a building may be taken from a perspective a person standing within a room of a building (e.g., standing in the center of the room). A street level image can depict objects such as buildings, trees, monuments, etc. from a perspective of a few feet above the ground. The street level images can be used to provide an immersive 360° panoramic viewing experience to a user centered on a geographic area of interest.

The street level images may be captured using any suitable technique and/or any suitable image capture device. For instance, the street level images may be captured by a camera mounted on top of a vehicle, from a camera angle pointing roughly parallel to the ground and from a camera position at or below the legal limit for vehicle heights (e.g. 7-14 feet). However, street level images need not be limited to any particular height above the ground. For example, a street level image can be taken from the top of a building. Panoramic street level images can be created by stitching together the plurality of photographs taken from the different angles. The panoramic image can be presented as a flat surface or as a texture-mapped three dimensional surface such as, for instance, a cylinder or a sphere.

Each street level image can be stored as a set of pixels associated with color and brightness values. For example, if the images are stored in JPEG format, the image can be displayed as a set of pixels in rows and columns, with each pixel being associated with a value that defines the color and brightness of the image at the pixel's location. Street level images can also be stored in the form of videos, such as be displaying MPEG videos captured by analog video camera or displaying, in succession, time-sequenced photographs that were captured by a digital still camera.

Additionally, the street level images need not be limited to photographic images. For example, street level images may also include three-dimensional (3D) representations of geographic areas. For instance, the street-level images may be a mesh of points that allow different views of an environment to be rendered from the point of view of a virtual camera. Thus, it should be appreciated that, as used herein, the term "image" may refer to a photographic image or a 3D representation of a geographic area, such as a photographic image or 3D representation of the interior of a building or the area surrounding a street.

Similar to map images, street level images stored in the street level image database 122 can be indexed and stored based on geographic location. Locations can be expressed and requested in various ways including, latitude/longitude/altitude positions, street addresses, points on a map (such as when a user clicks or taps on a map), building names, or other data capable of identifying one or more geographic locations.

In addition to being associated with geographic locations, street level images can be associated with orientation data indicating the orientation of the image. For instance, the viewing angle of a particular street level image can be the angle associated with a particular view of a virtual camera, and may be defined by both a tilt viewing angle and an azimuthal viewing angle. The tilt viewing angle of a view depicted in a street level image may be the angle of the view up or down relative to a horizontal plane. The azimuthal viewing angle of a street level image may be a specific angle around the 360° panoramic image relative to a reference line.

Figure 2:
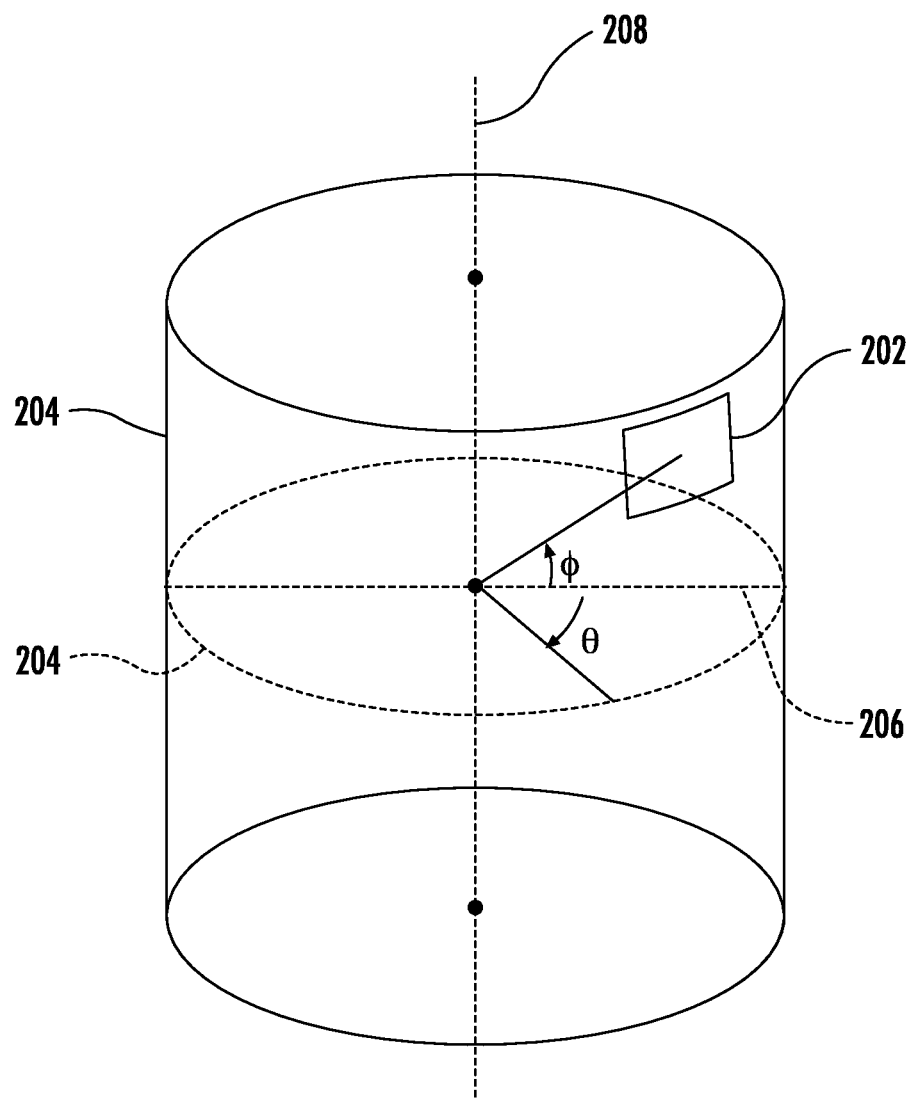
FIG. 2 illustrates a conceptual representation of an exemplary 360° panoramic image presented as a three-dimensional cylindrical surface centered about a geographic point of interest.

The viewing angle of an exemplary street level image may be more readily understood with reference to FIG. 2, which illustrates a conceptual representation of an exemplary 360° panoramic image 200 presented as a three-dimensional cylindrical surface about a geographic point of interest. However, the panoramic image 200 could also be presented as a flat surface or a spherical surface. The panoramic image 200 includes a plurality of street level images, such as street level image 202, that provide various views of the geographic area depicted in the panoramic image 200. Each of the street level images that make up panoramic image 200 may be associated with a viewing angle defined by a tilt viewing angle and/or an azimuthal viewing angle for the particular view presented in the street level image 202.

Figure 4:
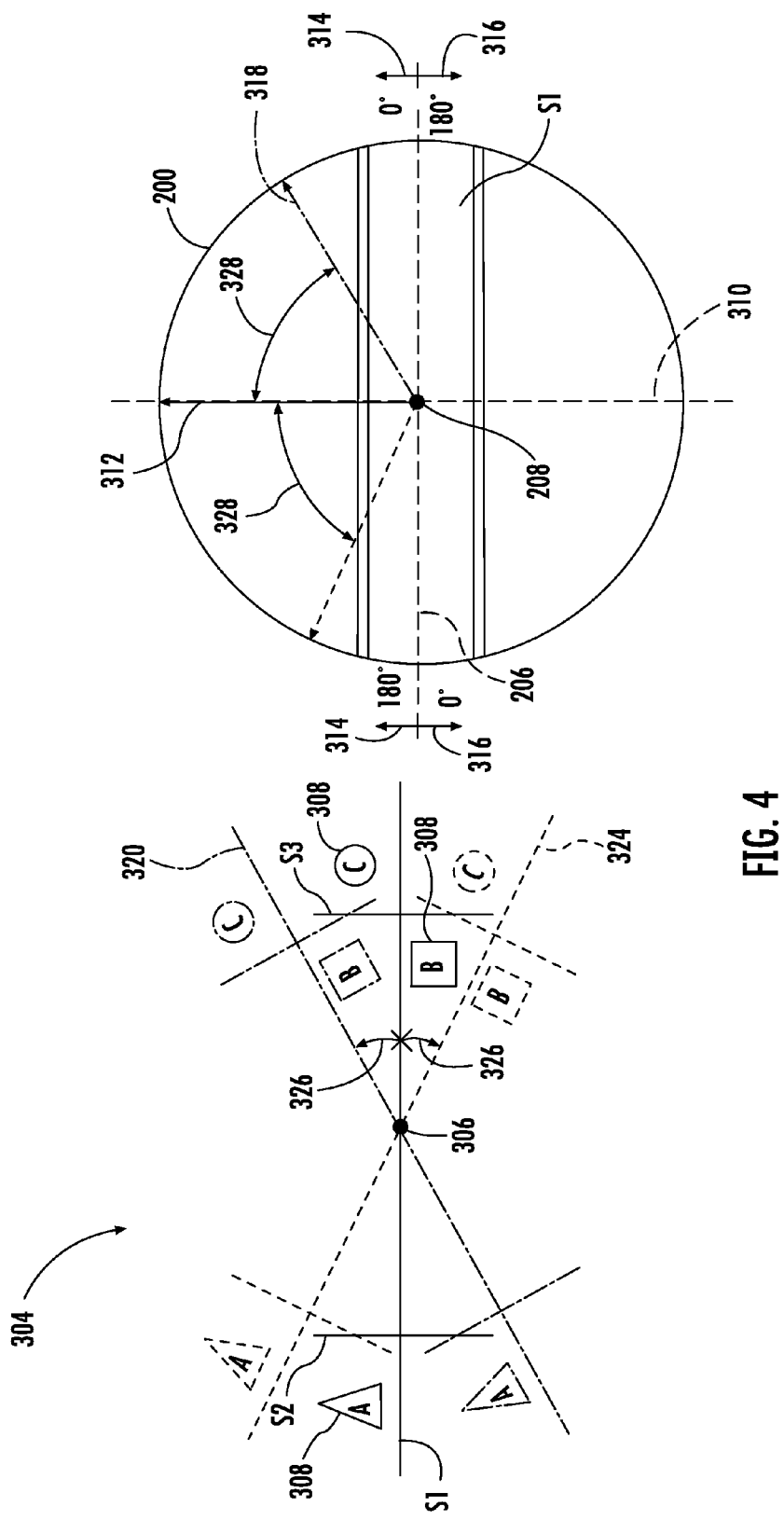
FIG. 4 illustrates one embodiment of how data included within the map shown in FIG. 3 may be oriented or skewed based on a viewing angle of the panoramic image, particularly illustrating the map data on the left side and a top-down view of the conceptual representation of the panoramic image shown in FIG. 2 on the right side.

For instance, street level image 202 may be associated with a tilt viewing angle $\phi$ defined relative to a horizontal plane 204. Thus, the tilt viewing angle $\phi$ may change, for example, by moving the current view vertically up or down relative to the horizontal plane 204, such as by moving the current view from being directed at the sidewalk in front of a building to being directed at the top of the building. Similarly, the street level image 202 may also be associated with an azimuthal viewing angle $\theta$ defined around the 360° panoramic image 300 relative to a reference line 206 extending within a plane (e.g., horizontal plane 204) oriented perpendicular to a central axis 208 of the panoramic image 200. In several embodiments, the reference line 206 may be selected so as to extend parallel to the street along which the panoramic image 200 is located. For example, as shown in FIG. 4 (the right hand side illustrating a top view of the cylindrical representation of the panoramic image 200 shown in FIG. 2), the reference line 206 may extend parallel to the orientation of the street S1 through the central axis 208 of the panoramic image 200. As such, the azimuthal viewing angle $\theta$ may be changed by rotating the current view relative to the reference line 206 about the central axis 208.

It should be appreciated that the current viewing angle of a panoramic image may be adjusted using any suitable input feature and/or input means known in the art. For example, in one embodiment, the current viewing angle may be adjusted using a click and drag operation, wherein a user clicks on or taps (for touch screens) the street-level image being presented and drags the cursor or his/her finger along such image.

Referring back to FIG. 1, the server 110 may also include an entity database 124. The entity database 124 may store information associated with entities depicted in street level images and in map imagery. As used herein, an "entity" refers to any feature, landmark, point of interest, or other object associated with a geographic location. For instance, an entity can include a business, restaurant, retail outlet, coffee shop, bar, music venue, attraction, museum, theme park, arena, ballpark, stadium, etc. Data associated with the entities can include the name of the entity and the location of the entity, such as longitude, latitude, and altitude coordinates associated with the entity, and specific indicia associated with the entity (e.g., names, images, logos and/or other identifying marks).

The server 110 may be configured to receive requests for data, such as data stored in any of the map database 120, the street level image database 122, and/or the entity database 124, and respond to those requests via the network 140. For instance, the server 110 can encode data in one or more data files and provide the data files to a client 130 over the network 140.

A client 130 can be any computing device that can be used by a user to interact with the system 100. For instance, a client can be a personal computer, smartphone, mobile device, desktop, laptop, PDA, tablet, or other computing device. In short, a client 130 can be any computer device or system that can execute instructions to allow a user to interact with the system 100.

The client 130 can include a processor 132 and a memory 134. The processor 132 can be any suitable processing device. The memory 134 can store computer-readable instructions that when executed by the processor 132 cause the processor 132 to perform operations. The client 130 may include various input/output devices 136 for providing and receiving information from a player, such as a touch screen, touch pad, data entry keys, speakers, and/or a microphone suitable for voice recognition. The client 130 may also include a display 135 for presenting information, such as street level images, to the user. The client 130 may further include a network interface 138 for providing communications over the network 140. The network interface 138 can be any device/medium that allows the client to interface with the network 140. The client 130 can send a request for panoramic imagery, such as street level imagery at a selected geographic location, to the server 110 over the network 140 via the network interface 138. The client 130 may then receive panoramic imagery and data associated with the panoramic imagery at the selected location and present at least a portion of the panoramic imagery through a viewport on any suitable output device set forth in a browser presented on a display 135.

The network 140 can be any type of communications network, such as a local area network (e.g. intranet), wide area network (e.g. Internet), or some combination thereof. The network can also include a direct connection between a client 130 and the server 110. In general, communication between the server 110 and a client 130 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Referring now to FIG. 3, an exemplary user interface 300 for displaying immersive panoramic imagery, such as street level imagery 202 through a viewport 302, is illustrated in accordance with aspects of the present subject matter. The user interface 300 may be a browser display presented on any suitable computing device, such as a mobile device, smartphone, PDA, tablet, laptop, desktop, or other suitable computing device. In several embodiments, in addition to the street-level imagery 202, the user interface 300 may also be configured to present information associated with the immersive panoramic imagery. For instance, as shown in FIG. 3, the user interface 300 may be configured to display a map 304 superimposed over a portion of the street level imagery 202 (e.g., over a bottom portion of the street level imagery 202). As will be described below, the map 304 may include data associated with the area surrounding the geographic location 306 of the panoramic image currently being viewed by the user (i.e., the actual location at which the panoramic image is centered within the geographic area).

It should be appreciated that, in one embodiment, the user interface 300 may be configured to continuously display the map 304 over a portion of the street level image 202 being presented to the user. In other embodiments, the user interface 300 may only be configured to display the map 304 when there is a user interaction with the interface 300. For example, in one embodiment, the map 304 may be displayed when an input icon (e.g., a mouse icon) is moved and/or positioned over a portion of the street level image 202. In another embodiment, the map 304 may be displayed when a specific user input is received, such as when a user clicks or taps on the user interface 300 or when a user performs a click and drag operation along a portion of the user interface 300.

It should also be appreciated that, in one embodiment, the entire map 304 may be opaque or filled-in such that the portion of the street level image 202 covered by the map 304 is not visible to the user. Alternatively, the map 304 may be entirely or partially semi-transparent or transparent such that portions of the street level image 202 covered by the map 304 may be viewed by the user.

As shown in FIG. 3, the map 304 may include travel way data associated with the means for traveling around and/or within the area surrounding the geographic location 306. For example, the travel way data may include street segment data providing an overheard, top-down view of the street(s) located within the area surrounding the geographic location 306. In one embodiment, the street segment data may include all or a portion of the street S1 on which the panoramic image is centered (hereinafter referred to as the "active street S1"). In addition, the street segment data may also include all or a portion(s) of any other street(s) located within close proximity to the geographic location 306. For example, as shown in FIG. 3, the map 304 depicts a portion of the active street S1 and portions of a second street S2 and a third street S3 that intersect the active street S1 in the vicinity of the geographic location 306. However, it should be appreciated that, if no other streets are located within the local vicinity of the panoramic image, the map 304 may simply depict the active street S1.

The map 304 may also display entity data in the form of indicia 308 associated with the entities located within the area surrounding the geographic location 306. For instance, as shown in FIG. 3, indicia 308 associated with the entities located along the portions of the streets shown on the map 304 (e.g., entities A, B and C) may be displayed, with each indicium 308 being depicted on the map 304 at a location along the street(s) relative to the actual geographic location of its corresponding entity. It should be appreciated that the indicium 308 associated with each entity may generally be any suitable word(s), number(s), mark(s), logo(s) and/or image(s) that identify the particular entity and/or distinguish the entity from other entities visually represented on the map 304. For instance, in one embodiment, the indicium 308 for each entity may include the name of the entity and/or an image or logo that is associated with the entity and/or that identifies the services offered by the entity (e.g., by showing a fork and knife for a restaurant or a shopping cart for a grocery store).

In several embodiments, the data displayed on the map 304 may be normalized to allow for a simplified street/entity network to be presented to the user. For instance, in one embodiment, the street segment data displayed on the map 304 may be normalized by depicting each street as a straight line segment (i.e., removing any curves or bends in the street(s)). Thus, as shown in FIG. 3, the active street S1 may be depicted as a straight line segment extending through and centered about the geographic location 306 of the panoramic image being currently viewed by the user. Additionally, any other street(s) displayed on the map 304 may also be depicted as straight line segments, with the orientation of such street(s) relative to the active street S1 being normalized to further simplify the street network presented to the user. For example, as shown in FIG. 3, streets displayed on the map 304 that intersect the active street S1 (e.g., the second and third streets S2, S3) may be depicted as straight line segments extending perpendicular to the active street S1. Similarly, streets displayed on the map 304 that extend lengthwise along either side of the active street (not shown) may be depicted as straight line segments extending parallel to the active street S1. Moreover, the relative distances shown on the map 304 between displayed data (e.g., between street and/or entity locations) may also be normalized. For example, in one embodiment, all distances shown in the map 304 may be reduced to a constant size based on the screen size of the client's display 135 or based on the dimensions of the viewport 302 of the user interface 300.

Additionally, in other embodiments, the travel way data displayed on the map 304 may be associated with any other suitable walkways, pathways or other means for traveling around the area surrounding the geographic location 306. For example, when the street level images depict interior non-street areas, such as the interior of a building, the travel way data may include floor plans, corridors, hallways and/or any other indoor passageways. Additionally, such travel way data may be normalized, similar to that described above for the street segment data, to provide a simplified map 304 for viewing by the user. Moreover, when the street level images depicts exterior non-street areas, such as a park or other natural area, the travel way data may include trails, walkways and/or any other outdoor pathways and may be normalized to simplify the map 304 displayed to the user.

Further, in several embodiments, at least a portion of the data displayed on the map 304 may be oriented or skewed to match the current viewing angle associated with the street-level image 202 being presented within the user interface 300. For instance, FIG. 4 illustrates one example of how such orienting or skewing of the map data may be implemented. As shown in FIG. 4, a viewpoint line 310 may be defined that extends perpendicular to the reference line 206 through the central axis 208 of the panoramic image 200 and that generally represents the viewpoint from the perspective of a person facing outwardly at a 90° angle from the active street S1 at the geographic location 306. In such an embodiment, the viewpoint line 310 may generally serve as a reference for skewing the map data in one direction or the other. For instance, when the current view of the street level image 202 is directed perpendicular to the reference line 206 and, thus, extends along the viewpoint line 310 (indicated by the solid arrow 312), the orientation of the active street S1 displayed on the map 304 may be horizontal (as shown by the solid lines on the left side of FIG. 4). However, when the current view of the street level image 202 is directed at an angle defined between the viewpoint line 310 and the reference line 206, the orientation of the data displayed on the map 304 may be appropriately angled or skewed to indicate the difference in the current view versus the perpendicular view represented by the viewpoint line 310. For example, it may be assumed for purposes of explanation that the azimuthal viewing angle θ associated with a given street level image 202 is measured between 0 and 180 degrees along each side of the reference line 206 (i.e., along a first side 314 and a second side 316 of the active street S1). Additionally, it may be assumed that the azimuthal viewing angle θ increases in the counter-clockwise direction so that the azimuthal viewing angle θ at the three o'clock position shown in FIG. 4 is equal to 0 degrees on the first side 314 of the active street S1 and 180 degrees on the second side 316 of the active street S1 and the azimuthal viewing angle θ at the six o'clock position shown in FIG. 4 is equal to 180 degrees on the first side 314 of the active street S1 and 0 degrees on the second side 316 of the active street S1.

As shown in FIG. 4, when the current azimuthal viewing angle θ is equal to an angle ranging between 0° and 90° such that the current view of the street level image 202 (indicated by the dashed arrow 318) is rotated clockwise away from the viewpoint line 310 along the first side 314 of the active street S1, the data displayed on the map 304 (indicated by dashed lines 320) may be rotated counter-clockwise about the geographic location 306 of the panoramic image 200 to match the orientation of the current view. Similarly, when the current azimuthal viewing angle θ is equal to angle ranging between 90° and 180° such that the current view of the street level image 202 (indicated by the dashed arrow 322) is rotated counter-clockwise away from the viewpoint line 310 along the first side 314 of the active street S1, the data displayed on the map 304 (indicated by dashed lines 324) may be rotated clockwise about the geographic location 306 to match the orientation of the current view. In such an embodiment, a skew angle 326 of the active street S1 relative to horizontal may be defined as a function of the rotational offset between the current azimuthal viewing angle θ and the viewpoint line 310 (i.e., offset angle 328). Thus, as the current view of the street level image 202 is rotated away from the viewpoint line 310, the angle 326 at which the active street S1 is skewed relative to horizontal may be increased.

It should be appreciated that any suitable correlation may be defined between the skew angle 326 and the offset angle 328. However, in several embodiments, it may be desirable for the variation in the skew angle 326 to be relatively small in comparison to the variation in the offset angle 328 to ensure that the map data may be appropriately skewed without requiring a relatively large map 340 to be superimposed over the street level image 202. For example, in particular embodiment, for every 10° the azimuthal viewing angle θ is rotationally offset from the viewpoint line 310 along either side 314, 316 of the active street S1, the street S1 may be skewed 1° clockwise or counter-clockwise from horizontal.

Figure 5:
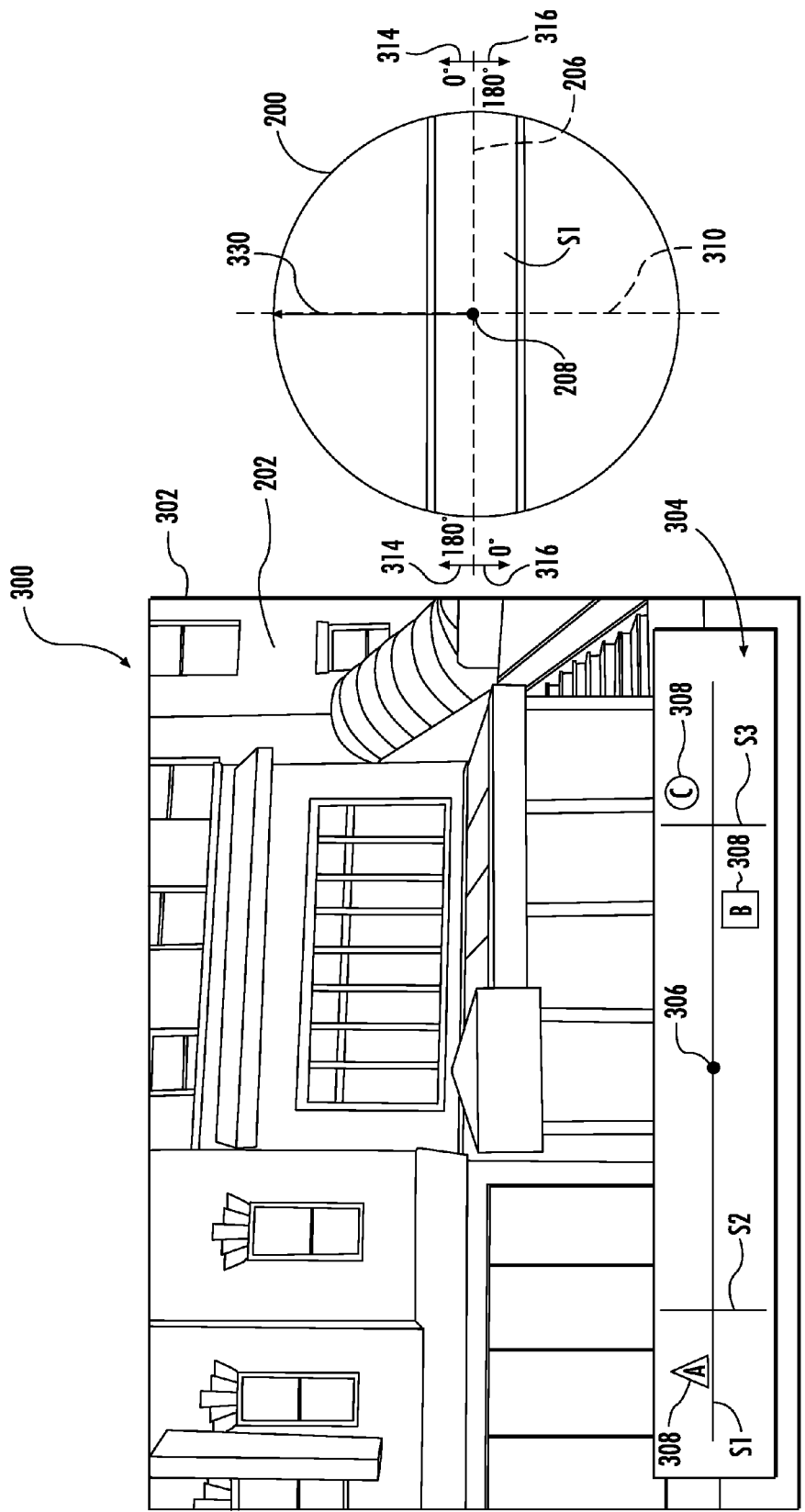
FIGS. 5-9 illustrate specific examples how the map data superimposed over the panoramic image may be oriented based on the viewing angle of the panoramic image in accordance with aspects of the present subject matter.
Figure 6:
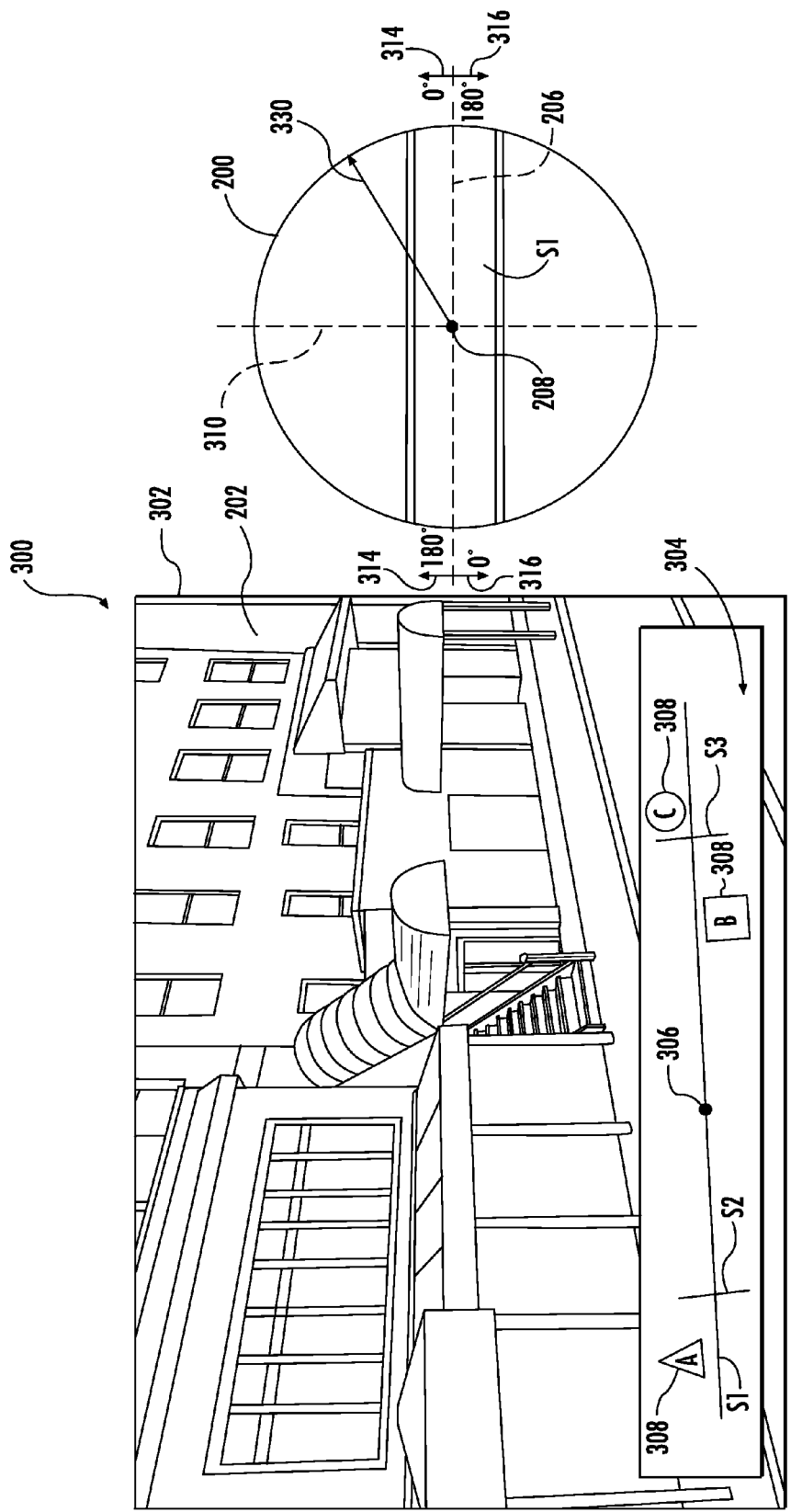
Figure 7:
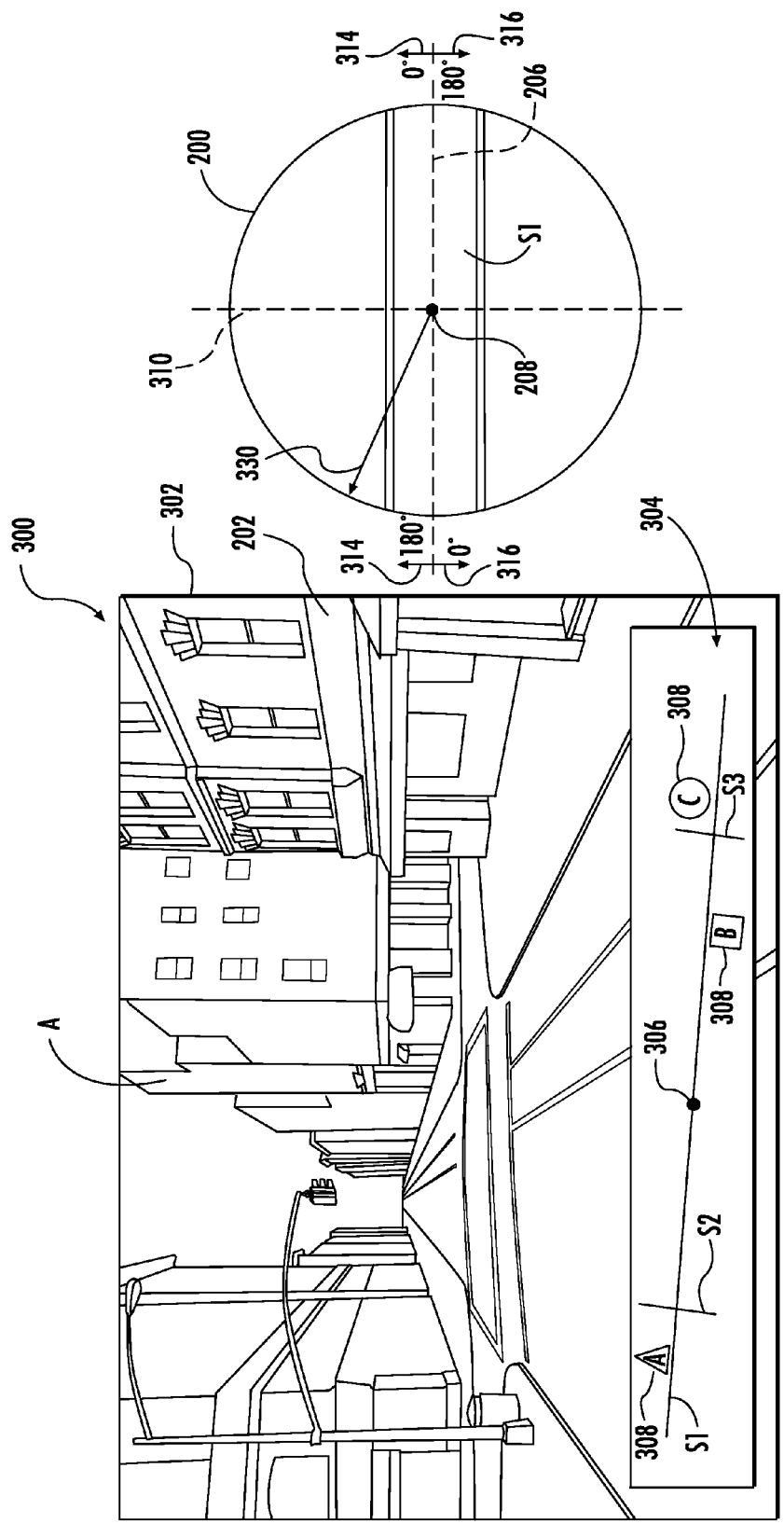

Referring now to FIGS. 5-8, several examples of the disclosed user interface 300 including differing views of street level images 202 are illustrated in accordance with aspects of the present subject matter. As shown in FIG. 5, the current view of the street level image 202 (indicated by arrow 330) is oriented generally perpendicular to the direction of the active street S1 (i.e., in a direction parallel to the viewpoint line 310 alone the first side 314 of the active street S1). Thus, as indicated above, the active street S1 may be oriented on the map 304 generally horizontally. However, as the current view of the street level image 202 is rotated clockwise or counter-clockwise from the view shown in FIG. 5, the data displayed on the map 304 may be rotated in the opposite direction to match the orientation of the current view. For example, as shown in FIG. 6, the current view of the street level image 202 (indcted by arrow 330) has been rotated clockwise relative to the view shown in FIG. 5 (e.g., in the direction of the corner of the intersection of the active street S1 and the third street S3). In such an embodiment, the data displayed on the map 304 may be rotated counter-clockwise about the geographic location 306 of the panoramic image 200 so that the right side of the active street S1 is positioned above horizontal, thereby indicating that a person facing outwardly along the viewpoint line 310 towards the first side 314 of the street S1 would be required to turn right to view the geographic area from the same perspective shown in the street level image 202. Alternatively, as shown in FIG. 7, the current view of the street level image 202 has been rotated counter-clockwise relative to the view shown in FIG. 5 (e.g., in the direction of the corner of the intersection of the active street S1 and the second street S2). In such an embodiment, the data displayed on the map 304 may be rotated clockwise so that the left side of the active street S1 is positioned above horizontal, thereby indicating that a person facing outwardly along the viewpoint line 310 towards the first side 314 of the street S1 would be required to turn left to view the geographic area from the same perspective shown in the street-level image 202.

Figure 8:
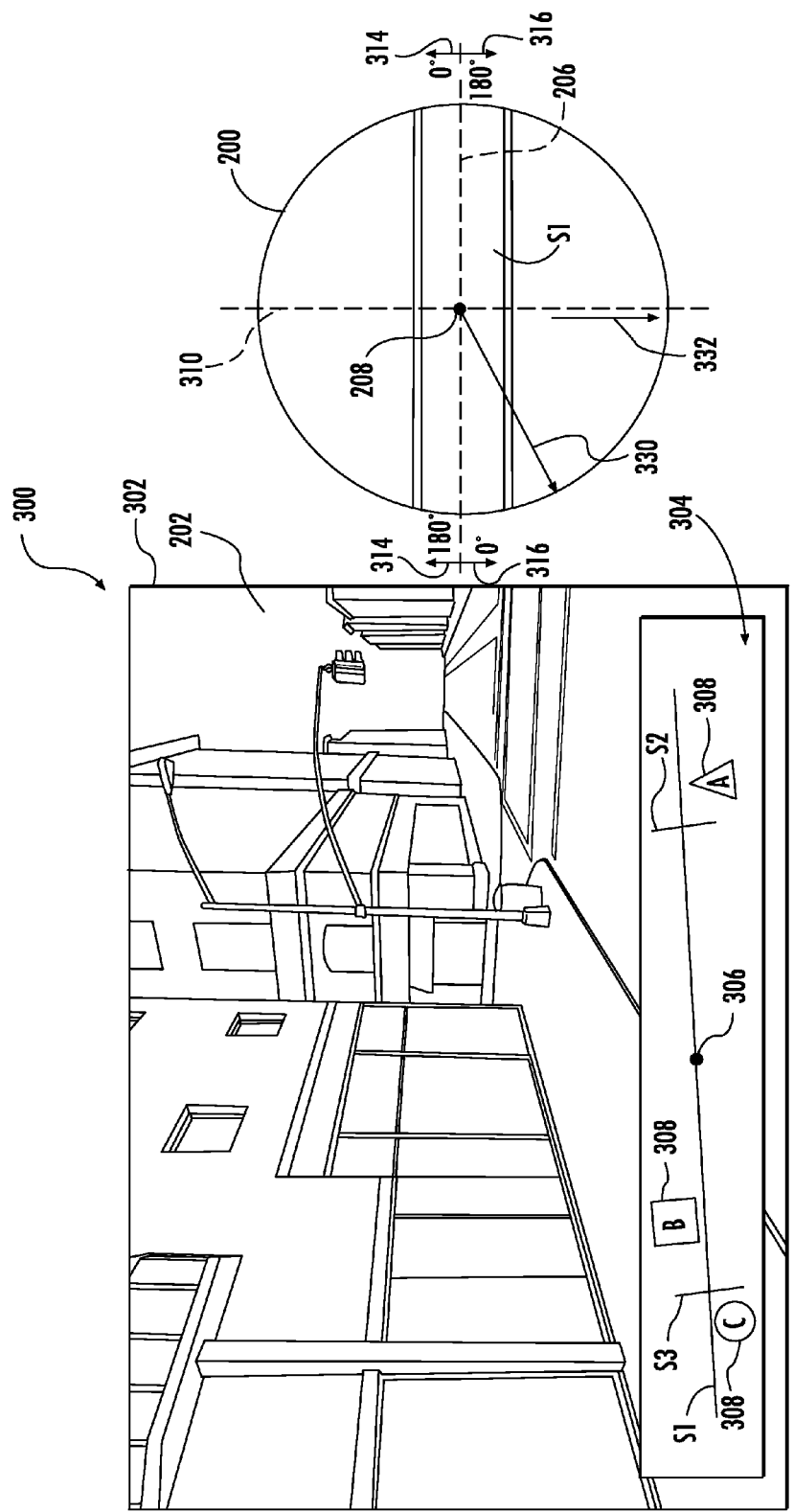

Additionally, as shown in FIG. 8, the data displayed on the map 304 may be similarly angled or skewed when the current view of the street level image 202 (indicated by arrow 330) is rotated across the reference line 206 to the second side 316 of the active street S1. However, unlike the examples shown in FIGS. 5-7, the orientation of the map data may be referenced from the portion of the viewpoint line 310 extending along the second side 316 of the active street S1 (i.e., from the perspective of a person facing outwardly at a 90 degree angle from the active street S1 towards the second side 316 of the street S1, as shown by arrow 332) Thus, as shown in FIG. 8, since the current view of the street level image 202 is oriented clockwise relative to the portion of the viewpoint line 310, the data displayed on the map 304 may be rotated counter-clockwise so that the right side of the active street S1 is positioned above horizontal, thereby indicating a person facing outwardly along the viewpoint line 310 towards the second side 316 of the street S1 (i.e., in the direction of arrow 332) would be required to turn right to view the geographic area from the same perspective shown in the street-level image 202. Additionally, it should be appreciated that the data displayed on the map 304 may be flipped, as compared to how such data is displayed in FIGS. 5-7, to indicate that the current view of the street level image 202 is directed along the second side 316 of the active street S1. For example, comparing the positioning of the map data shown in FIG. 8 to that shown in FIG. 7, the data has been flipped 180 degrees about both an axis extending along the length of the active street S1 (i.e., so that the data positioned on the second side 316 of the street S1, such as Entity B, is displayed at the top of the map 304) and an axis extending perpendicular to the active street S1 at the geographic location 306 of the panoramic image 200 (e.g., so that the intersection of the active street S1 and the second street S2 is positioned on the right side of the map 304).

Figure 9:
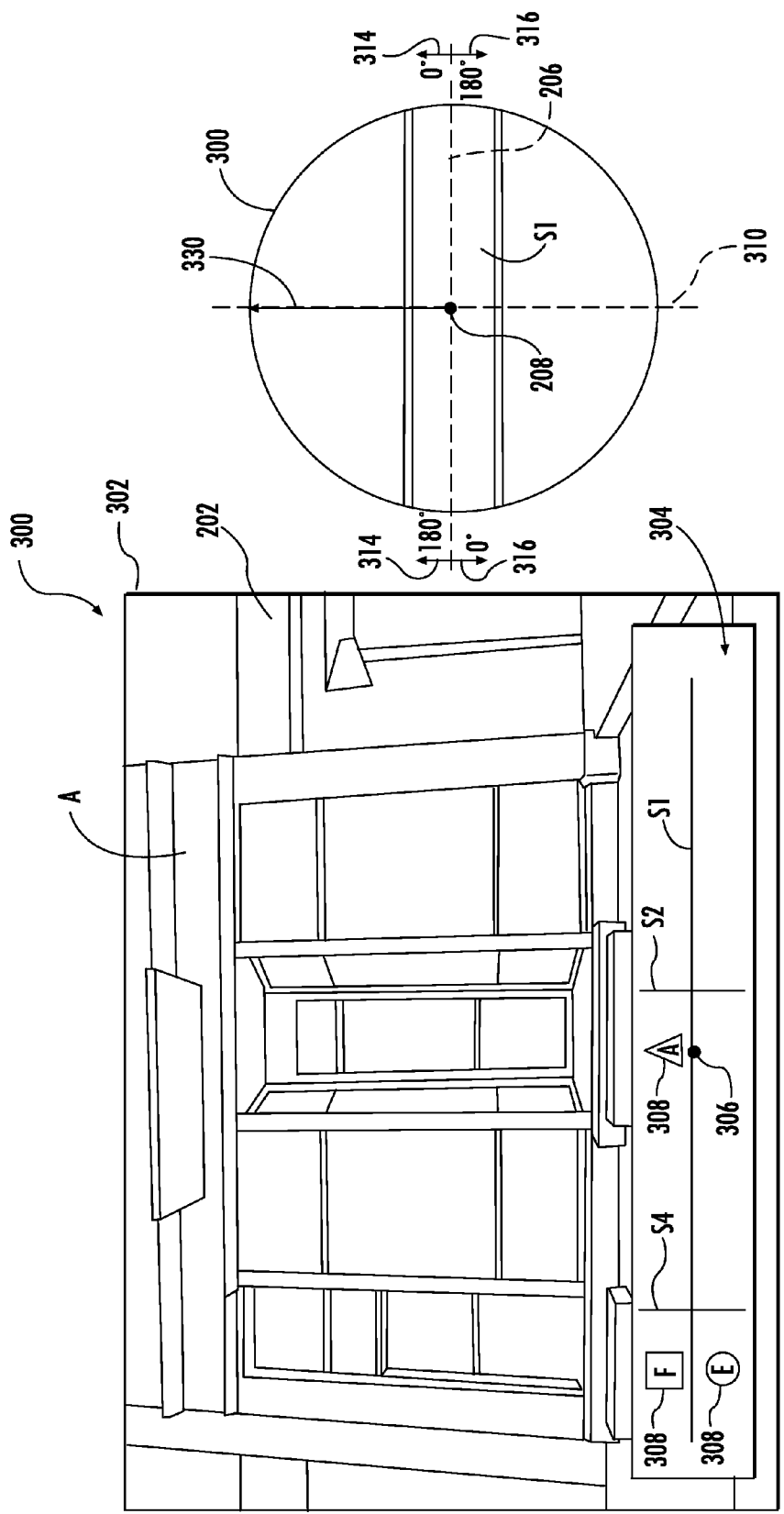

Moreover, in several embodiments, a user may be able to interact with the map 304 as a means for navigating between different panoramic images 200. Specifically, in one embodiment, by providing a user input selecting a specific location on the map 304 (e.g., by clicking on or touching the map 304 at a specific location), a street-level image 202 of the panoramic image 200 positioned at or closest to the geographic location corresponding to the selected location may be displayed on the user interface 300. For example, assuming that a user viewing the street-level image 202 shown in FIG. 7 desires to get a closer look at Entity A, the user may click on the indicium 308 displayed on the map 304 associated with Entity A. Thereafter, the user interface 300 may display a street-level image 202 forming part of the panoramic image 200 located adjacent to Entity A. For example, as shown in FIG. 9, in one embodiment, the user interface 300 may be configured to display a street-level image 202 of the panoramic image 202 located directly in front of Entity A on the street along which the entity is located (e.g., the active street S1). In such an embodiment, the street-level image 202 may, for instance, be oriented perpendicular to the street such that the current view of the street-level image (indicated by arrow 330) is facing directly towards the selected entity, thereby allowing the user to view at least a portion of the entity.

In another embodiment, the map 304 may be configured such that a user may navigate between panoramic images 200 by performing a click and drag operation along r portion of the map 304. For instance, the user may click on or touch (for touch screens) the map a304 and drag the cursor or his/her finger along the map 304 to slide between panoramic images 200 positioned at differing geographic locations. Such a sliding navigational technique may generally allow for a user to quickly and efficient navigate between spaced apart panoramic images. For example, instead of selecting the indicium associated with Entity A, the user may be able to click on the indicium and drag it to the center of the map 304, thereby allowing the user to quickly navigate to the view shown in FIG. 9.

It should be appreciated that, when navigating between panoramic images 200, the data displayed on the map 304 may change to show the street segment data (or other travel way data) and/or entity data located within the geographic area surrounding the new panoramic image. For example, as shown in FIG. 9, by navigating to the panoramic image 200 located in front of Entity A, the map 305 may only display the street segment data (e.g., active street S1 and a fourth street S4) and/or the entity data (e.g., Entity A, E and F) located within the geographic area surrounding such panoramic image 200.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for displaying geographic imagery, the method comprising:
    receiving, by one or more computing devices, a request to view a geographic image, the geographic image depicting a first portion of a panoramic image of a location within a geographic area, the first portion of the panoramic image defining a first viewing angle;
    in response to the request, providing for display, by the one or more computing devices, a modified image including a map defined within a map area superimposed over at least a portion of the geographic image, the map including travel way data displayed within the map area that is associated with the geographic area, the travel way data including a first line segment corresponding to a first travel way on which the panoramic image is located, the first viewing angle being defined relative to a reference line extending parallel to the first travel way; and
    orienting, by the one or more computing devices, the first line segment within the map area at a skew angle relative to a horizontal direction of the map based on the first viewing angle such that an angular orientation of the first line segment within the map area is associated with an angular orientation of the first viewing angle relative to the reference line.

2. The method of claim 1, wherein orienting the first line segment within the map area at the skew angle comprises orienting the first line segment such that the first line segment is oriented within the map area horizontally when the first viewing angle is perpendicular to the reference line.

3. The method of claim 1, wherein orienting the first line segment within the map area at the skew angle comprises orienting the first line segment such that the first line segment is oriented within the map at a non-zero skew angle relative to horizontal when the first viewing angle is not perpendicular to the reference line.

4. The method of claim 3, wherein a correlation exists between the non-zero skew angle and the first viewing angle such that the non-zero skew angle corresponds to an angle that is less than an angular offset defined between the first view viewing angle and a viewpoint line extending perpendicular to the reference line.

5. The method of claim 1, wherein a viewpoint line extends perpendicular to the reference line, the skew angle being defined as a function of an offset angle defined between the first viewing angle and the viewpoint line.

6. The method of claim 1, further comprising:
receiving a user input request to navigate to a second portion of the panoramic image, the second portion defining a second viewing angle that is different from the first viewing angle; and
adjusting the skew angle of the first line segment within the map area based on the second viewing angle.

7. The method of claim 6, wherein adjusting the skew angle of the first line segment within the map area based on the second viewing angle comprises adjusting the skew angle of the first line segment within the map area by rotating the first line segment clockwise or counterclockwise in a direction that is opposite from a direction of rotation required to move from the first viewing angle to the second viewing angle.

8. The method of claim 6, wherein adjusting the skew angle of the first line segment within the map area based on the second viewing angle comprises adjusting the skew angle of the first line segment by flipping the first line segment within the map area when the second viewing angle is defined on a different side of the reference line than the first viewing angle.

9. A system for displaying geographic imagery, the system comprising:
one or more computing devices including one or more processors and associated memory, the memory storing instructions that, when executed by the one or more processors, configure the one or more computing devices to:
receive a request to view a geographic image, the geographic image depicting a first portion of a panoramic image of a location within a geographic area, the first portion of the panoramic image defining a first viewing angle;
in response to the request, provide for display a modified image including a map defined within a map area superimposed over at least a portion of the geographic image, the map including travel way data displayed within the map area that is associated with the geographic area, the travel way data including a first line segment corresponding to a first travel way on which the panoramic image is located, the first viewing angle being defined relative to a reference line extending parallel to the first travel way; and
orient the first line segment within the map area at a skew angle relative to a horizontal direction of the map based on the first viewing angle such that an angular orientation of the first line segment within the map area is associated with an angular orientation of the first viewing angle relative to the reference line.

10. The system of claim 9, wherein the one or more computing devices are configured to orient first line segment within the map area at the skew angle such that the first line segment is oriented horizontally when the first viewing angle is perpendicular to the reference line.

11. The system of claim 9, wherein the one or more computing devices are configured to orient the first line segment within the map area at the skew angle such that the first line segment is oriented at a non-zero skew angle relative to horizontal when the first viewing angle is not perpendicular to the reference line.

12. The system of claim 11, wherein a correlation exists between the non-zero skew angle and the first viewing angle such that the non-zero skew angle corresponds to an angle that is less than an angular offset defined between the first view viewing angle and a viewpoint line extending perpendicular to the reference line.

13. The system of claim 9, wherein a viewpoint line extends perpendicular to the reference line, the skew angle being defined as a function of an offset angle defined between the first viewing angle and the viewpoint line.

14. The system of claim 9, wherein the one or more computing devices are configured to receive a user input request to navigate to a second portion of the panoramic image, the second portion defining a second viewing angle that is different from the first viewing angle, the one or more computing devices being further configured to adjust the skew angle of the first line segment within the map area based on the second viewing angle.

15. The system of claim 14, wherein the one or more computing devices are configured to adjust the skew angle of the first line segment within the map area by rotating the first line segment clockwise or counterclockwise in a direction that is opposite from a direction of rotation required to move from the first viewing angle to the second viewing angle.

16. The system of claim 14, wherein the one or more computing devices are configured to adjust the skew angle of the first line segment by flipping the first line segment within the map area when the second viewing angle is defined on a different side of the reference line than the first viewing angle.

17. A tangible, non-transitory computer-readable medium storing computer-executable instructions that, when executed by one or more processors, cause the one or more processors to perform operations, comprising:
receiving a request to view a geographic image, the geographic image depicting a first portion of a panoramic image of a location within a geographic area, the first portion of the panoramic image defining a first viewing angle;
in response to the request, providing for display a modified image including a map defined within a map area superimposed over at least a portion of the geographic image, the map including travel way data displayed within the map area that is associated with the geographic area, the travel way data including a first line segment corresponding to a first travel way on which the panoramic image is located, the first viewing angle being defined relative to a reference line extending parallel to the first travel way; and
orienting the first line segment within the map area at a skew angle relative to a horizontal direction of the map based on the first viewing angle such that an angular orientation of the first line segment within the map area is associated with an angular orientation of the first viewing angle relative to the reference line.

18. The computer-readable medium of claim 17, wherein orienting the first line segment within the map area at the skew angle comprises orienting first line segment within the map area at the skew angle such that the first line segment is oriented horizontally when the first viewing angle is perpendicular to the reference line.

19. The computer-readable medium of claim 17, wherein orienting the first line segment within the map area at the skew angle comprises orienting first line segment within the map area at the skew angle such that the first line segment is oriented within the map at a non-zero skew angle relative to horizontal when the first viewing angle is not perpendicular to the reference line.

20. The computer-readable medium of claim 17, further comprising:
    receiving a user input request to navigate to a second portion of the panoramic image, the second portion defining a second viewing angle that is different from the first viewing angle; and
    adjusting the skew angle of the first line segment within the map area based on the second viewing angle.

* * * * *